United States Patent [19]
Gerdes

[11] Patent Number: 6,045,065
[45] Date of Patent: Apr. 4, 2000

[54] METHOD OF MAINTAINING A UNIFORM CHEMICAL DEPTH UNDER THE CENTER PIVOT PORTION OF A CORNER IRRIGATION SYSTEM

[75] Inventor: Jerry D. Gerdes, Omaha, Nebr.

[73] Assignee: Valmont Industries, Inc., Valley, Nebr.

[21] Appl. No.: 09/152,401

[22] Filed: Sep. 14, 1998

[51] Int. Cl.$^7$ .................................................. B05B 3/00
[52] U.S. Cl. ................................................ 239/729; 239/1
[58] Field of Search ................................. 239/1, 727, 729

[56] References Cited

U.S. PATENT DOCUMENTS

| | | | |
|---|---|---|---|
| 3,902,668 | 9/1975 | Daugherty et al. | 239/177 |
| 3,979,062 | 9/1976 | Christensen et al. | 239/729 |
| 4,161,292 | 7/1979 | Holloway et al. | 239/11 |
| 4,227,648 | 10/1980 | Holloway et al. | 239/11 |
| 4,340,183 | 7/1982 | Kegel et al. | 239/729 |
| 4,729,514 | 3/1988 | Ostrom et al. | 239/727 |
| 5,435,495 | 7/1995 | Davis | 239/728 |
| 5,678,771 | 10/1997 | Chapman | 239/727 |

*Primary Examiner*—Steven O. Douglas
*Assistant Examiner*—Tuan Nguyen
*Attorney, Agent, or Firm*—Zarley, McKee, Thomte, Voorhees & Sease; Dennis L. Thomte

[57] ABSTRACT

The method of controlling the speed of the last regular drive unit (L.R.D.U.) of a center pivot irrigation machine having a corner span pivotally connected thereto comprising: placing an angle sensor at the pivotal connection of the main boom and the extension boom for monitoring the angle therebetween upon predetermined time increments; changing the speed of the L.R.D.U. according to the formula:

NEW SPEED=$(LS)^2/(LS+PC)^2 \times$L.R.D.U. Speed Setting where PC is the projected corner length, LS is the corner length and wherein PC is computed according to:

$PC=[(LC)^2+(LS)^2-(2 \times LC \times LS \times \cos AC°)]^{1/2}-LS$ where AC is the corner angle.

5 Claims, 4 Drawing Sheets

LEGEND
A = PROJECTED CORNER LENGTH (PC)
B = CORNER LENGTH (LC)
C = SYSTEM LENGTH (LS)
D = CORNER ANGLE (AC)
L.R.D.U.= LAST REGULAR DRIVE UNIT

METHOD OF MAINTAINING A UNIFORM CHEMICAL DEPTH UNDER THE CENTER PIVOT PORTION OF A CORNER IRRIGATION SYSTEM

BACKGROUND OF THE INVENTION

1. Field of the Invention

This invention relates to a center pivot irrigation system having the ability to irrigate the corners of the field being irrigated. More particularly, this invention relates to an improved method for controlling the application of chemicals beneath the center pivot portion of a corner irrigation system.

Even more particularly, this invention relates to a method for varying the speed of a center pivot irrigation machine equipped with a corner span to compensate for the change in area covered by the machine as the corner span moves away from the center pivot area and as it moves towards the center pivot area to maintain a uniform chemical depth beneath the center pivot portion of the machine.

2. Description of the Related Art

Conventional center pivot irrigation systems comprise an elongated main boom pivotally connected at its inner end to a center pivot structure and extending outwardly therefrom. The main boom of the conventional center pivot irrigation system is comprised of a plurality of pipes connected together in an end-to-end fashion which are supported upon a plurality of drive towers. In most conventional center pivot irrigation systems, the outermost drive tower or last regular drive unit (L.R.D.U.) is the master tower with the other drive towers being selectively driven in response to angular displacement of the boom section adjacent thereto.

In the early 1970s, corner systems for center pivot irrigation systems were developed to enable the corners of a square field to be irrigated. See, for example, U.S. Pat. Nos. 3,797,517; 3,802,726; and 3,902,668. Corner systems usually consist of an extension boom or arm, sometimes referred to as a corner span, which is pivotally connected to the outer end of the main boom and which is supported on at least one steerable drive tower. A guidance system is provided for guiding or steering the extension tower, and extension boom, out into the corners of the field as the main arm travels around the field. Perhaps the most popular method of guiding the extension tower is the buried wire system described in U.S. Pat. No. 3,902,668.

A plurality of spaced-apart sprinklers are provided on the main boom as well as on the extension boom. The sprinklers on the extension boom are not activated until the extension boom moves out into the corners of the field. Current center pivot irrigation systems with corner spans are used to apply chemicals to the area (field) beneath the system as the system moves around the area being chemigated. A problem associated with such chemigation is that the area being chemigated increases as the corner span moves away from the center pivot area and the area decreases as the corner span moves towards the center pivot area. The change in area being chemigated makes it difficult to maintain a uniform chemical depth beneath the center pivot portion of the machine.

In an effort to apply the chemicals uniformly beneath the center pivot portion of the system, the speed of the center pivot will be changed once (slowed down) as the corner span moves away from the center pivot area and the speed will be changed once (increased) as the corner span moves towards the center pivot area. This results in a large portion of the area beneath the center pivot machine to be either over chemigated or under chemigated.

SUMMARY OF THE INVENTION

A center pivot irrigation system with a corner span attachment is described herein which includes a center pivot support structure located in the field to be chemigated. An elongated main water boom, having inner and outer ends, is pivoted at its inner end to the center pivot support structure and extends outwardly therefrom. The main water boom is comprised of an elongated main water pipe supported upon a plurality of non-steerable drive towers which propel the main water pipe around the center pivot support structure. An elongated extension boom, having inner and outer ends, is pivotally connected at its inner end to the outer end of the main boom with the extension boom comprising an elongated extension water pipe supported upon at least one steerable drive tower.

A plurality of spaced-apart sprinklers are provided on the main boom for irrigating and chemigating the field beneath the main boom. The total area covered by the center pivot machine equipped with a corner span is calculated using a computer program. Inputs to the computer program are the angle made by the corner span with respect to the center pivot spans, the center pivot length, and the corner span length. The corner span angle is measured using a potentiometer and computer software with the angle being monitored at predetermined time increments at the downstream end of the center pivot portion of the machine. The center pivot speed is changed by the ratio of the center pivot area to the total area (center pivot area plus corner span area) by the following equation using computer software:

$$\text{NEW SPEED} = (LS)^2/(LS+PC)^2 \times \text{L.R.D.U. Speed Setting}$$

where PC is the projected corner length and LS is the system length. The value of PC is determined by the following equation:

$$PC = [(LC)^2 + (LS)^2 - (2 \times LC \times LS \times \cos AC^\circ)]^{1/2} - LS$$

where AC equals the corner angle and LC is the corner length.

It is therefore a principal object of the invention to provide a method for varying the speed of a center pivot irrigation machine equipped with a corner span to compensate for the change in area covered by the machine as the corner span moves away from the center pivot area and as it moves towards the center pivot area to maintain a uniform chemical depth beneath the center pivot portion of the machine.

These and other objects will be apparent to those skilled in the art.

DESCRIPTION OF THE PREFERRED EMBODIMENT

Figure 1:
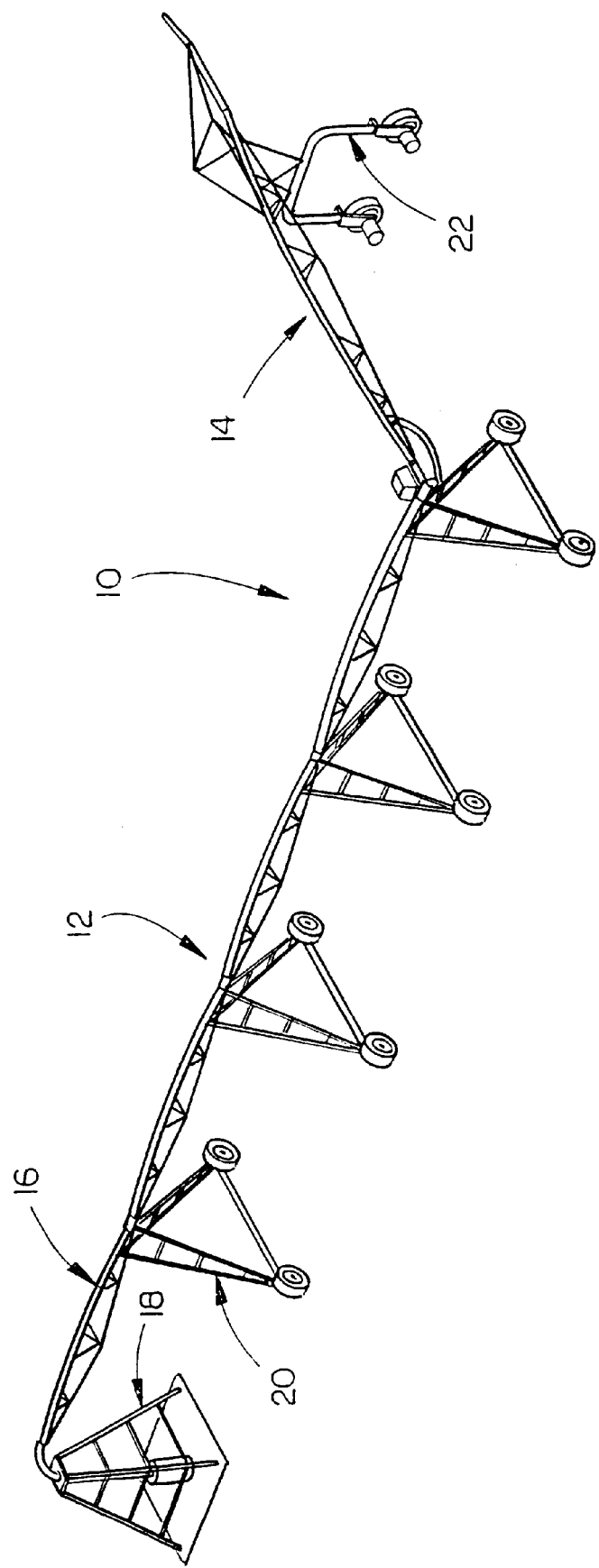
FIG. 1 is a perspective view of a center pivot irrigation machine equipped with a corner span.

The numeral 10 refers generally to a self-propelled irrigation system which is comprised of a center pivot irrigation system 12 having a corner arm irrigation system or extension boom 14 pivotally connected to the outer end thereof. Generally speaking, center pivot irrigation system 12 is of conventional design and includes a main water conduit or boom 16 which extends outwardly from a conventional center pivot structure 18. Main boom 16 is supported by a plurality of drive towers 20 in conventional fashion. The drive towers 20 are designed to propel the center pivot system around the center pivot structure 18 in conventional fashion. The numeral 21 refers to the outermost or last regular drive unit (L.R.D.U.). Corner arm, corner span, corner boom or extension boom 14 is supported upon a steerable drive tower 22. A conventional angle sensor of the potentiometer type is provided between the main boom 16 and extension boom 14 to monitor the angle between boom 16 and boom 14 in conventional fashion.

Figure 2:
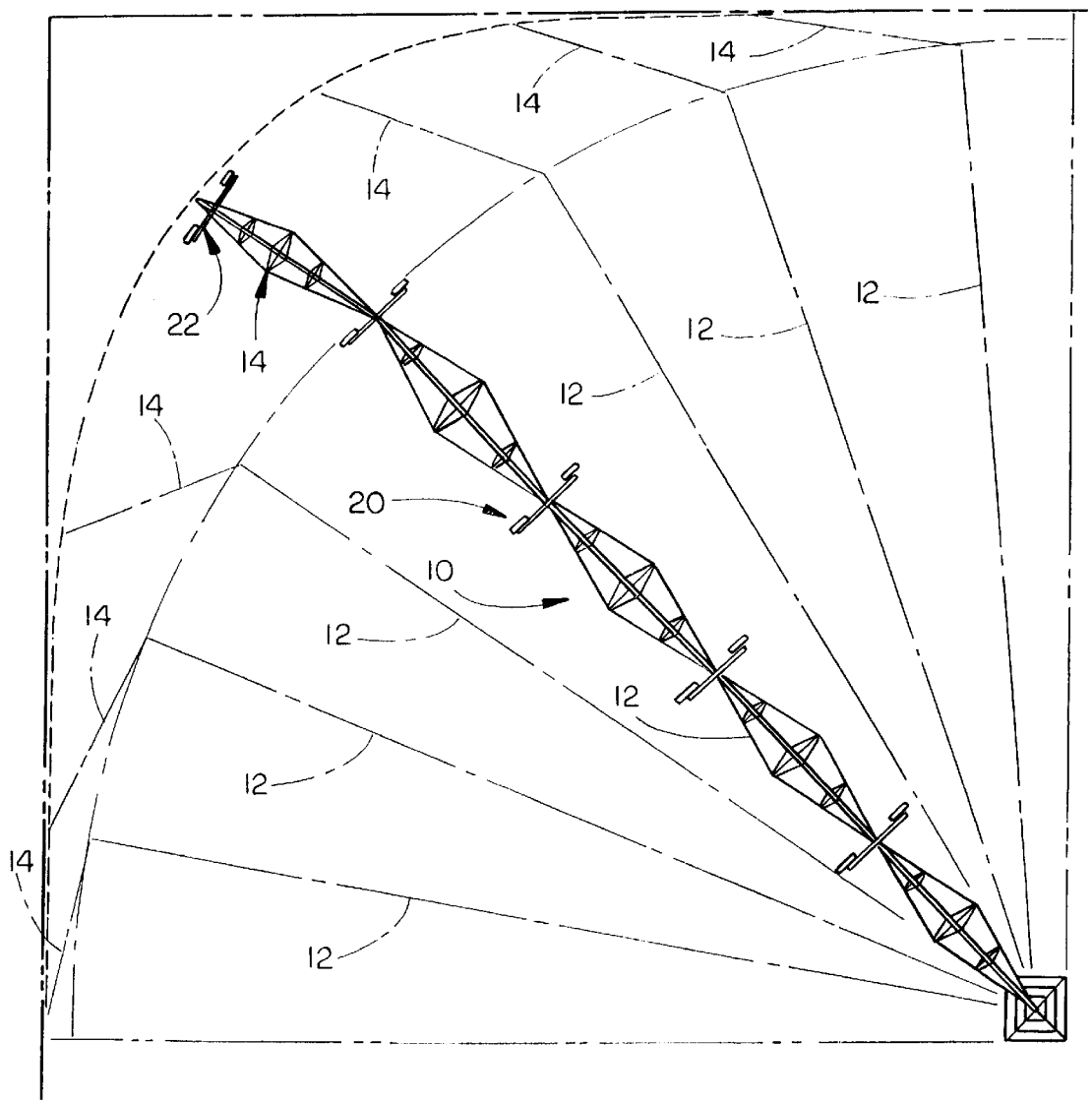
FIG. 2 is a plan view of the machine of FIG. 1 illustrating various positions of the machine.

FIG. 2 illustrates the manner in which the main boom 12 moves around the field being chemigated. FIG. 2 also illustrates the manner in which the corner span 14 moves away form the center pivot area and moves towards the center pivot area. The speed of the L.R.D.U. is adjusted as the corner span moves away from the center pivot area and is adjusted as the corner span moves towards the center pivot area upon a predetermined time increment at the downstream end of the center pivot portion of the machine. Preferably, computer software in a conventional computer 24 either continuously monitors the angle between the main boom 12 and corner span 14 or monitors the angle at predetermined time increments and then changes or adjusts the speed of the L.R.D.U. accordingly. The software in computer 24 is programmed with the L.R.D.U. speed setting which will be assumed to be twelve ft/min for this description, the corner length (LC), and the system length (LS). The speed of the L.R.D.U. will be adjusted at predetermined time increments as the corner span moves away from the center pivot area and adjusted at predetermined time increments as the corner span moves towards the center pivot area according to the equation:

$$\text{NEW SPEED} = (LS)^2/(LS+PC)^2 \times \text{L.R.D.U. Speed Setting}$$

The value of the projected corner length (PC) is determined by the software in the computer 24 according to the equation:

$$PC = [(LC)^2 + (LS)^2 - (2 \times LC \times LS \times \cos AC^\circ)]^{1/2} - LS$$

where AC is the sensed corner angle between span 14 and boom 12.

Figure 3:
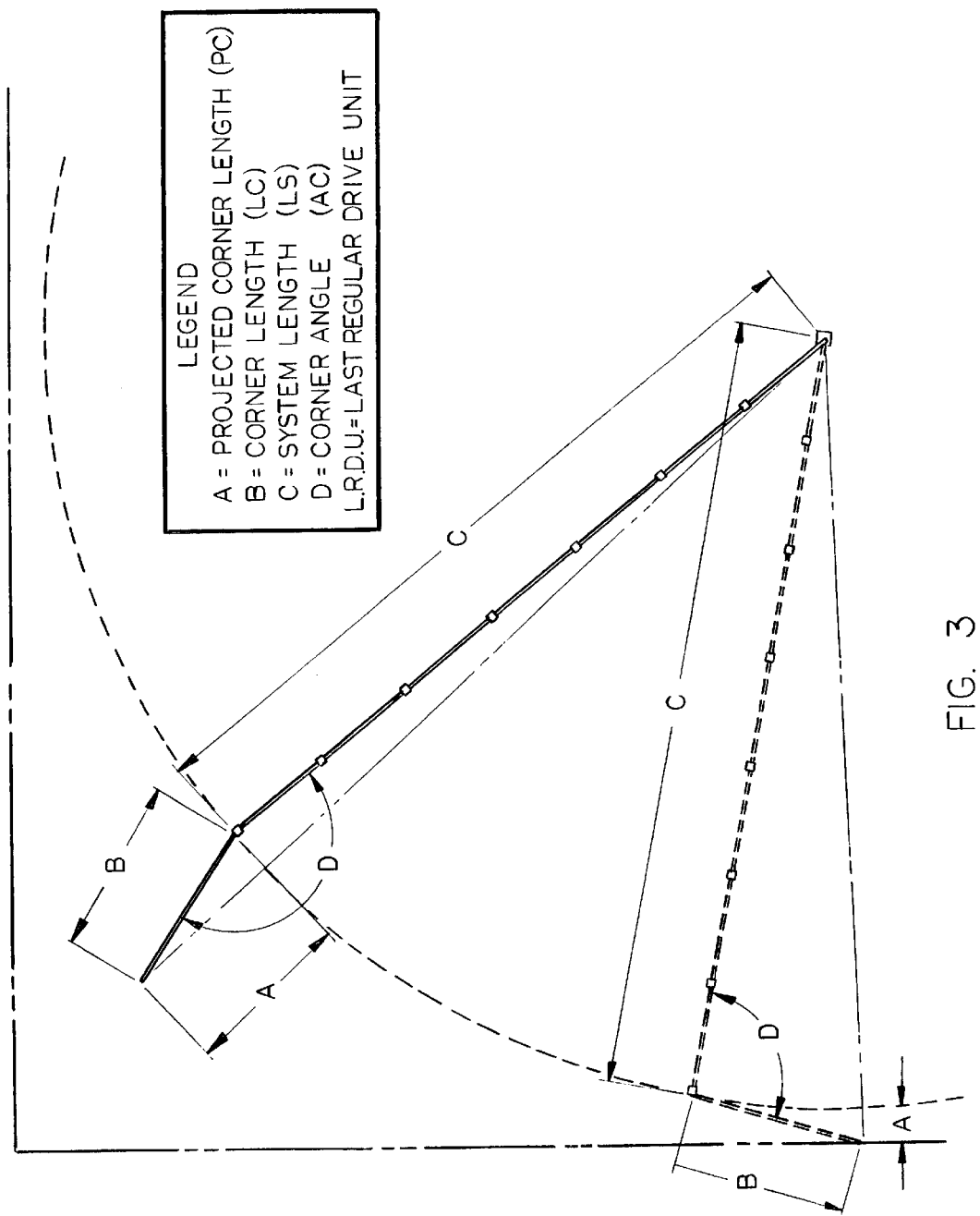
FIG. 3 is a schematic illustrating the manner in which the speed of the L.R.D.U. is computed.
Figure 4:
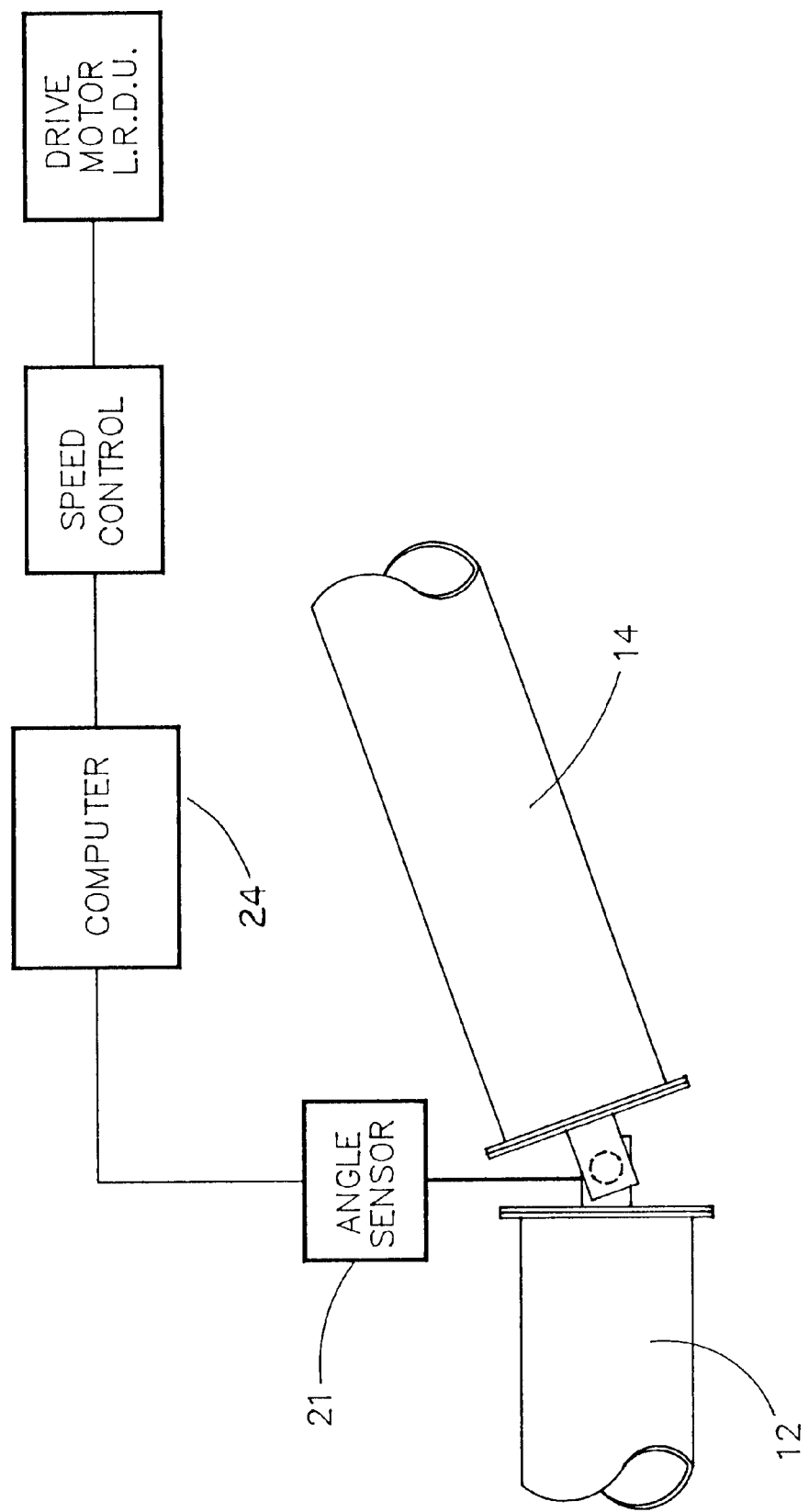
FIG. 4 is a schematic illustrating the manner of varying the speed of the L.R.D.U.

Referring to FIG. 3, Example Nos. 1 and 2 are illustrated. In Example No. 1, the speed of L.R.D.U. will be adjusted to 10.6 ft/min to slow down the L.R.D.U. from its 12.0 ft/min movement, since the span 14 is beginning to move away from the center pivot area. In Example No. 2, the corner span 14 is covering a larger area, since it is also fully extended. In the position of Example No. 2, the speed of the L.R.D.U. is adjusted or changed to 8.1 ft/min.

While it is preferred that the speed of the L.R.D.U. be adjusted either continuously or at predetermined time increments, the speed could be adjusted upon a predetermined amount of movement of the L.R.D.U.

Thus it can be seen that a novel method has been provided for varying the speed of the L.R.D.U. as the corner span moves away from the center pivot area and moves towards the center pivot area to ensure a uniform depth of chemical application beneath the center pivot area.

Thus it can be seen that the invention accomplishes at least all of its stated objectives.

I claim:

1. The method of maintaining a uniform chemical depth under a center pivot irrigation machine having a corner span pivotally connected thereto which is movable out into the corners of a field to irrigate or chemigate the same, comprising:

computing, at predetermined intervals, the change in area covered by the center pivot irrigation machine as the corner span moves away from the center pivot area and as the corner span moves towards the center pivot area;

and varying the speed of the center pivot irrigation machine according to the computations at said predetermined intervals.

2. A method for controlling the application of chemicals beneath the center pivot portion of a corner irrigation system which includes a center pivot portion having a last regular drive unit (L.R.D.U.) which pivots around a center pivot structure and which further includes a corner span pivotally connected to the center pivot portion which moves away from the center pivot portion and which moves towards the center pivot portion to irrigate the corners of a field as the center pivot portion pivots around the center pivot structure, comprising:

placing an angle sensor at the pivotal connection of the center pivot portion and the corner span for monitoring the angle therebetween;

changing the speed of said L.R.D.U. approximately according to:

$$\text{NEW SPEED} = (LS)^2/(LS+PC)^2 \times \text{L.R.D.U. Speed Setting}$$

where PC is the projected corner length, LS is the corner length and w herein PC is computed according to:

$$PC = [(LC)^2 + (LS)^2 \times (2 \times LC \times LS \times \cos AC^\circ)]^{1/2} - LS$$

where AC is the corner angle.

3. The method of claim 2 wherein said monitoring is continuous.

4. The method of claim 2 wherein said monitoring occurs upon predetermined amounts of movement of said L.R.D.U.

5. The method of claim 2 wherein said monitoring occurs at predetermined time intervals.

* * * * *